(12) United States Patent
Zhou et al.

(10) Patent No.: US 11,849,203 B2
(45) Date of Patent: Dec. 19, 2023

(54) OPTICAL LENS, CAMERA MODULE AND CORRESPONDING ASSEMBLY METHOD

(71) Applicant: Ningbo Sunny Opotech Co., Ltd, Zhejiang (CN)

(72) Inventors: Guangfu Zhou, Zhejiang (CN); Hui Li, Zhejiang (CN); Chao Ye, Zhejiang (CN); Ling Zhong, Zhejiang (CN); Ke Shi, Zhejiang (CN); Xiaoming Ding, Zhejiang (CN); Hailong Liao, Zhejiang (CN)

(73) Assignee: NINGBO SUNNY OPOTECH CO., LTD, Zhejiang (CN)

( * ) Notice: Subject to any disclaimer, the term of this patent is extended or adjusted under 35 U.S.C. 154(b) by 341 days.

(21) Appl. No.: 17/433,021

(22) PCT Filed: Jan. 3, 2020

(86) PCT No.: PCT/CN2020/070226
§ 371 (c)(1),
(2) Date: Aug. 23, 2021

(87) PCT Pub. No.: WO2020/173223
PCT Pub. Date: Sep. 3, 2020

(65) Prior Publication Data
US 2022/0159152 A1    May 19, 2022

(30) Foreign Application Priority Data
Feb. 28, 2019 (CN) .......................... 201910148287.5

(51) Int. Cl.
*H04N 23/55* (2023.01)
*G03B 17/12* (2021.01)
*G02B 7/02* (2021.01)

(52) U.S. Cl.
CPC ............. *H04N 23/55* (2023.01); *G02B 7/025* (2013.01); *G03B 17/12* (2013.01)

(58) Field of Classification Search
CPC ...... H04N 23/55; H04N 17/002; G02B 7/025; G02B 7/021; G02B 7/023; G02B 13/0085; G03B 17/12
See application file for complete search history.

(56) References Cited

U.S. PATENT DOCUMENTS

| | | |
|---|---|---|
| 7,657,167 B2 | 2/2010 | Utz |
| 8,842,367 B2 | 9/2014 | Chen |

(Continued)

FOREIGN PATENT DOCUMENTS

| | | |
|---|---|---|
| CN | 202837655 | 3/2013 |
| CN | 207336891 | 5/2018 |

(Continued)

OTHER PUBLICATIONS

Extended European Search Report dated Feb. 22, 2022 in corresponding European Patent Application No. 20763613.5.

(Continued)

*Primary Examiner* — Hung H Lam
(74) *Attorney, Agent, or Firm* — Wenderoth, Lind & Ponack, L.L.P.

(57) ABSTRACT

A method for assembling an optical lens includes preparing a first lenses part including a first lens and a second lenses part including a second lens, capturing the first lenses part, and adjusting a posture of the first lenses part according to a distance measurement result, so that an included angle between a first end surface of the first lenses part and a second end surface of the second lenses part is less than a threshold of inclination angle. The method also includes adjusting the first lenses part at degree of freedom of linear movement to complete pre-positioning, performing an (Continued)

active alignment of a position of the first lenses part at the degree of freedom of linear movement according to an actual imaging result, and fixing the first and second lenses parts together, so that their relative positions are maintained at the relative positions determined by the active alignment.

20 Claims, 6 Drawing Sheets

(56) References Cited

U.S. PATENT DOCUMENTS

| | | | |
|---|---|---|---|
| 11,703,654 B2* | 7/2023 | Liu | H04N 17/002 |
| | | | 348/374 |
| 2008/0075446 A1 | 3/2008 | Utz | |
| 2011/0075276 A1* | 3/2011 | Lin | H04N 23/55 |
| | | | 359/811 |
| 2013/0063655 A1* | 3/2013 | Hsu | H04N 23/55 |
| | | | 156/303.1 |
| 2013/0176625 A1 | 7/2013 | Chen | |
| 2014/0254034 A1* | 9/2014 | Lyu | G02B 7/021 |
| | | | 359/819 |
| 2018/0188469 A1* | 7/2018 | Hsiao | G02B 7/021 |
| 2023/0012466 A9* | 1/2023 | Wang | G02B 7/023 |

FOREIGN PATENT DOCUMENTS

| | | |
|---|---|---|
| CN | 208367291 | 1/2019 |
| CN | 208432778 | 1/2019 |
| CN | 208506341 | 2/2019 |
| WO | 2019/228348 | 12/2019 |

OTHER PUBLICATIONS

International Search Report dated Mar. 23, 2020 in International (PCT) Application No. PCT/CN2020/070226 with English translation.

* cited by examiner

OPTICAL LENS, CAMERA MODULE AND CORRESPONDING ASSEMBLY METHOD

RELATED APPLICATION

This application claims the benefit of the priority of the Chinese patent application filed on Feb. 28, 2019 with the application number of 201910148287.5 and the title of "Optical Lenses, Camera Module and Corresponding Assembly method". The entire content of the above application is incorporated herein by reference.

TECHNICAL FIELD

The present invention relates to the technical field of photography and camera equipment, and particularly to the technical field of compact camera modules.

BACKGROUND ART

With the development of technology, today consumers have more and more diverse needs for imaging, so that high-quality lenses such as large-aperture lenses, telephoto lenses, and large wide-angle lenses are produced, and consumers have increasingly higher requirements for imaging quality. In order to reduce the difficulty of assembling a lenses and decrease the assembly tolerance of the lenses and the camera module, the applicant proposes an assembly method for dividing a complete lenses into at least two lenses parts, adjusting the at least two lenses parts by active alignment according to the imaging result, and then fixing the relative position of each lenses part to form a complete lenses. The influence of assembly tolerance between the components of the lenses on the resolution of the lenses is reduced by active alignment.

In the prior art, the amount of adjustment of the upper lenses part relative to the lower lenses part is calculated in the active alignment process according to the imaging result, and then the upper lenses part relative to the lower lenses part is adjusted at multiple degrees of freedom according to the adjustment amount. The adjustment direction (i.e., degrees of freedom) may involve translation in x, y, and z directions, and may also involve rotation in u, w, and v directions (rotation around the z-axis, x-axis, and y-axis, respectively). The imaging result is acquired again, the relative positions of the upper lenses part and the lower lenses part are adjusted according to the imaging result, and then the amount of adjustment of the upper lenses part relative to the lower lenses part is calculated again according to the imaging result, repeating this operation continuously until the imaging quality of the lenses meets the set requirements, then completing the assembly of the lenses. It may be seen that in the current split lenses assembly, the position adjustment of the upper lenses part relative to the lower lenses part may involve six directions. Therefore, the requirements for software algorithms are relatively high, and the required adjustment time is relatively long, and the efficiency of the equipment is low. At present, the iteration of the product of electronics terminal market (such as the mobile phone market) for consumers is fast, and higher requirements are put forward for production efficiency. For example, sometimes the output requirement of the designed final camera module reaches tens of millions or more, and such a large number of products may need to finish production and quality inspection in a very short time so as to meet the output requirement of hot-selling mobile phones. Therefore, it is easy to understand that the production efficiency is an important indicator for a camera module, and low production efficiency is very unfavorable for mass production of a product.

Therefore, there is an urgent need for a solution that may optimize the assembly process of a lenses and a camera module, improve the quality of the lenses and the camera module, and increase the working efficiency of the equipment.

CONTENTS OF THE INVENTION

The present invention provides a solution that may overcome at least one of the defects of the conventional products.

According to one aspect of the present invention, there provides a method for assembling an optical lenses, characterized by including: 1) preparing a first lenses part including at least one first lens and a second lenses part including at least one second lens; 2) capturing the first lenses part, wherein a capturing mechanism for capturing the first lenses part has a degree of freedom of linear movement and a degree of freedom of posture adjustment; 3) adjusting a posture of the first lenses part at the degree of freedom of posture adjustment according to a distance measurement result, so that an included angle between a first end surface of the first lenses part and a second end surface of the second lenses parts is less than a threshold of inclination angle; wherein the distance measurement includes: 31) measuring at least 30 second distance-measuring points on the second end surface with a distance-measuring device so as to identify a current inclination posture of the second end surface, wherein the at least 30 second distance-measuring points are distributed in a second area located on the second end surface and surrounding an optical region of the second lens; 32) measuring at least 30 first distance-measuring points on the first end surface with a distance-measuring device so as to identify a current inclination posture of the first end surface, and calculating a current included angle between the first end surface and the second end surface, wherein the at least 30 first distance-measuring points are distributed in a first area located on the first end surface and surrounding an optical region of the first lens; 33) judging whether the current included angle is less than the threshold of inclination angle, if yes, going to step 4), if not, adjusting the posture of the first lenses part at two degrees of freedom in v and w directions according to the current included angle, and then re-executing step 32) and step 33) until the current included angle is less than the threshold of inclination angle; 4) adjusting the first lenses part at the degree of freedom of linear movement, so that the first lenses part together with the second lenses part constitute an imageable optical system; 5) performing an active alignment of a position of the first lenses part according to an actual imaging result output by a photosensitive chip disposed under the optical system, wherein the active alignment is performed at the degree of freedom of linear movement; and 6) fixing the first lenses part and second lenses part together, so that relative positions of the two parts are maintained at the relative positions determined by the active alignment.

Wherein in the step 5), the first lenses part is not moved at the degree of freedom of posture adjustment during the process of the active alignment.

Wherein the degree of freedom of linear movement include three degrees of freedom in x, y, and z directions, wherein x, y and z constitute three coordinate axis directions of a three-dimensional rectangular coordinate system with O as an origin, wherein z direction is consistent with the direction of an optical axis of the optical lenses; the degree of freedom of posture adjustment include two degrees of freedom in v and w directions, wherein v direction is the direction of rotation around y axis, and w direction is the direction of rotation around x axis.

Wherein in the step 2), the capturing mechanism further has a degree of freedom of rotation in u direction, wherein u direction is a direction of rotation around z axis.

Wherein in the step 3), the threshold of inclination angle is 0.14142 degrees.

Wherein in the step 3), the threshold of inclination angle is 0.04243 degrees.

Wherein in the step 3), the threshold of inclination angle is 0.01414 degrees.

Wherein in the step 3), the number of the first distance-measuring points is at least 1,000, and the number of the second distance-measuring points is at least 1,000.

Wherein in the step 3), the first end surface is a top surface of the first lenses part, and the second end surface is a top surface of the second lenses part.

Wherein in the step 6), the first lenses part and the second lenses part are fixed together by bonding with an adhesive material.

Wherein the step 6) includes: 61) arranging an adhesive material on the top surface of the second lenses part; and 62) curing the arranged adhesive material, thereby fixing the first lenses part and the second lenses part together, so that the relative positions of the two parts are maintained at the relative positions determined by the active alignment.

Wherein the step 61) is performed before the step 5).

Wherein alternatively the step 61) is performed after the step 5).

Wherein in the step 3), the measurement of the at least 30 first distance-measuring points and the measurement of the at least 30 second distance-measuring points are realized by moving a distance-measuring device.

Wherein in the step 3), the distance-measuring device is mounted on a mobile platform, and the mobile platform is adjusted to a horizontal state based on a coordinate measuring instrument, and then the distance-measuring device is moved by the mobile platform so as to complete the measurement of all of the first distance-measuring points and the second distance-measuring points.

Wherein in the step 1), the first lenses part further includes a first lens barrel, and the at least one first lens is mounted on an inner side surface of the first lens barrel; the second lenses part further includes a second lens barrel, and the at least one second lens is mounted on an inner side surface of the second lens barrel.

Wherein in the step 1), a first cutting notch is provided on a top surface of the first lens barrel, and a second cutting notch is provided on a top surface of the second lens barrel.

Wherein in the step 1), a first cutting notch is provided on a bottom surface of the first lens barrel, and a second cutting notch is provided on the top surface of the second lens barrel.

Wherein in the step 4), the first lenses part is adjusted at the degree of freedom in u direction, so that the first cutting notch is parallel to the second cutting notch.

Wherein in the step 4), the first lenses part and the second lenses part are photographed and the photographs are identified based on computer vision technology, so as to determine whether the first cutting notch is parallel to the second cutting notch.

According to another aspect of the present application, there also provides a method for assembling a camera module, which includes:

a) assembling an optical lenses by any one of the above methods for assembling an optical lenses; and b) assembling the optical lenses and a photosensitive assembly together to obtain a camera module.

Wherein the step b) includes:

b1) adjusting a relationship of relative positions between the photosensitive assembly and the second lenses part based on resolution of an output image of the photosensitive assembly, so as to compensate for inclination of the image plane of the optical lenses; b2) bonding the second lenses part and the photosensitive assembly together, so that the relative positions of the two are maintained at the relative positions determined in the step b1).

Wherein the step b1) and the step 5) are performed simultaneously.

According to another aspect of the present application, there also provides an optical lenses, which includes: a first lenses part including at least one first lens; a second lenses part including at least one second lens; and a first adhesive material located in a gap between the first lenses part and the second lenses part, and supporting and fixing the first lenses part and the second lenses part after being cured, so that their relative positions are maintained in the relative positions determined by an active alignment; wherein a central axis of the first lenses part and a central axis of the second lenses part have a non-zero included angle, and an included angle is less than 0.14142 degrees; and a distance between the central axis of the first lenses part and the central axis of the second lenses part in a radial direction of the optical lenses is not zero and less than 50 microns.

Wherein a first cutting notch is provided on a first end surface of the first lenses part, and a second cutting notch is provided on a second end surface of the second lenses part.

Wherein the first cutting notch is located on a bottom surface of the first lenses part, and the second cutting notch is located on the top surface of the second lenses part.

According to another aspect of the present application, there also provides a camera module, which includes: any one of the above optical lenses; and a photosensitive assembly; wherein the photosensitive assembly and the optical lenses are assembled together by a second adhesive material.

According to another aspect of the present application, there also provides another method for assembling a camera module, which includes: 1) preparing separated first module part and second module part, wherein the first module part and the second module part are respectively an optical lenses and a photosensitive assembly; alternatively, the first module part and the second module part are respectively a photosensitive assembly and an optical lenses; 2) capturing the first module part, wherein a capturing mechanism for capturing the first module part has a degree of freedom of linear movement and a degree of freedom of posture adjustment; 3) adjust a posture of the first module part at the degree of freedom of posture adjustment according to a distance measurement result, so that an included angle between a first end surface of the first module part and a second end surface of the second module part is less than the threshold of inclination angle; wherein the distance measurement includes: 31) measuring at least 30 second distance-measuring points on the second end surface with a distance-measuring device so as to identify a current inclination posture of the second end surface, wherein the at least 30 second distance-measuring points are distributed in a second area located on the second end surface and surrounding a light-passing area of the optical lenses; 32) measuring at least 30 first distance-measuring points on the first end surface with a distance-measuring device so as to identify a current inclination posture of the first end surface, and calculating a current included angle between the first end surface and the second end surface, wherein the at least 30 first distance-measuring points are distributed in a first area located on the first end surface and surrounding a light-passing area of the optical lenses; 33) judging whether the current included angle is less than a threshold of inclination angle, if yes, going to step 4), if not, adjusting the posture of the first module part at two degrees of freedom in v and w directions according to the current included angle, and then re-executing step 32) and step 33) until the current included angle is less than the threshold of inclination angle; 4) adjusting the first module part at the degree of freedom of linear movement, so that the first module part together with the second module part constitute an imageable optical system; 5) performing an active alignment of a position of the first module part according to an actual imaging result output by a photosensitive chip disposed under the optical system, wherein the active alignment is performed at the degree of freedom of linear movement; and 6) fixing the first module part and second module part together, so that relative positions of the two parts are maintained at the relative positions determined by the active alignment.

Compared with the prior art, this application has at least one of the following technical effects:

1. The present application may reduce the difficulty of the active alignment algorithm by transferring at least a part of the adjustment in v and w directions from the active alignment step to the pre-adjustment step based on laser ranging, thereby improving the overall production efficiency of the camera module; wherein the adjustment in v and w directions may also be referred to as posture adjustment (for example, it may include adjustment of pitch attitude and yaw attitude) or inclination adjustment.
2. This application may maintain or improve the imaging quality of the camera module.
3. The present application may improve the consistency of the pre-positioning of a same batch of products based on the cutting notch, so as to reduce the burden of the active alignment step, thereby improving the production efficiency.
4. In the present application, the cutting notch may be arranged in a gap between the first lenses part and the second lenses part so as to avoid the influence of the cutting notch on the appearance of the product, thereby improving the appearance of the product.

BRIEF DESCRIPTION OF THE DRAWINGS

Exemplary embodiments are shown in the referenced drawings. The embodiments and drawings disclosed herein should be regarded as illustrative rather than restrictive.

FIG. 5(*b*) shows two degrees of freedom in v and w directions;

FIG. 5(*c*) shows a degree of freedom in u direction;

SPECIFIC EMBODIMENTS

Figure 1:
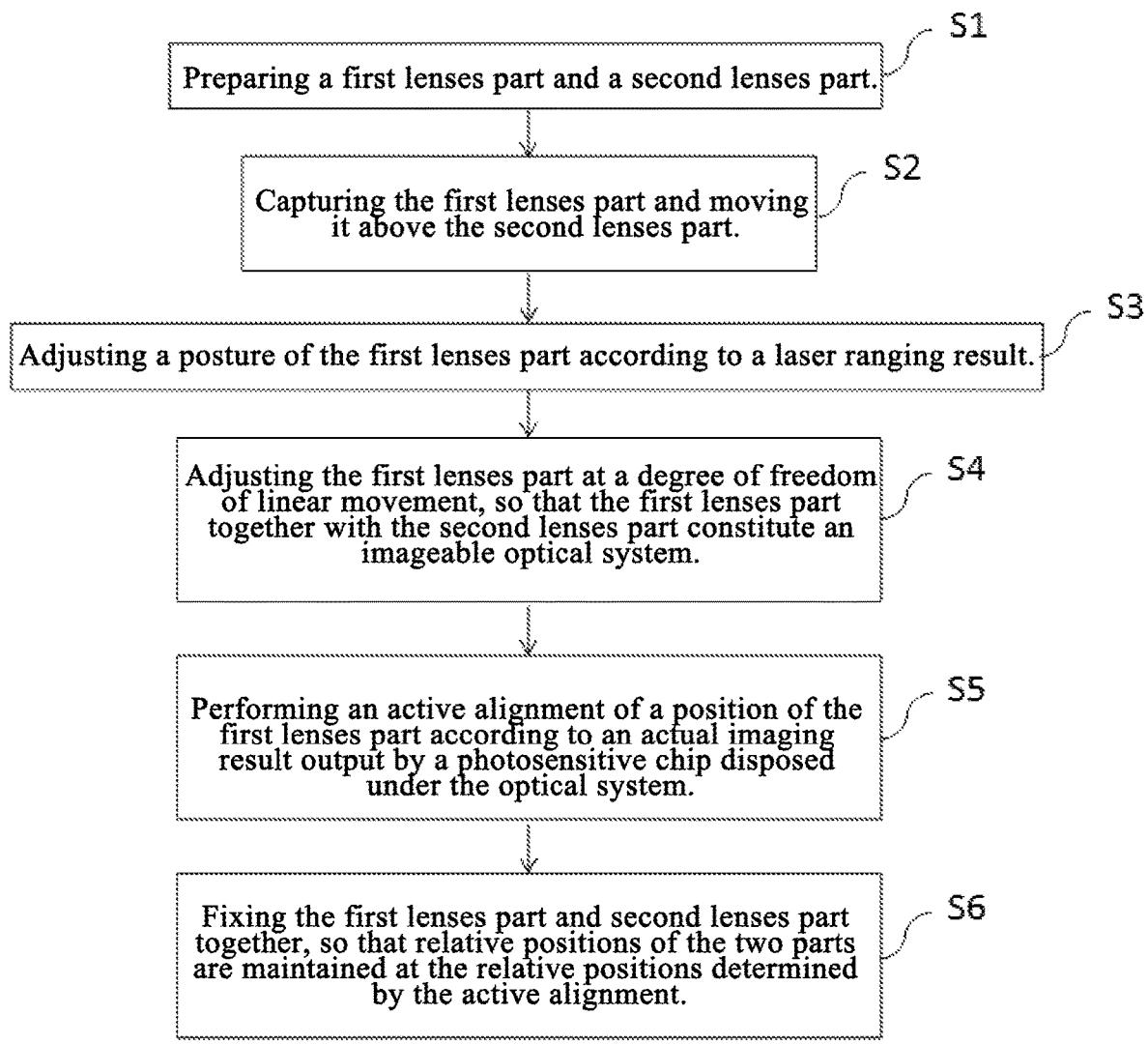
FIG. 1 shows a schematic flow chart of a method for assembling an optical lenses according to an embodiment of the present application.

In order to better understand the application, various aspects of the application will be described in more detail with reference to the accompanying drawings. It should be understood that, these detailed descriptions are only descriptions of exemplary embodiments of the present application, and are not intended to limit the scope of the present application in any way. Throughout the specification, the same reference numerals of the drawings refer to the same elements. The expression "and/or" includes any and all combinations of one or more of the associated items being listed.

It should be noted that in this specification, expressions such as first, second, etc. are only used to distinguish one feature from another feature, and do not represent any restriction on the feature. Therefore, without departing from the teachings of the present application, the first subject discussed below may also be referred to as the second subject.

In the drawings, the thickness, size, and shape of objects have been slightly exaggerated for sake of illustration. The drawings are only examples and are not drawn strictly to scale.

It should also be understood that the terms "including", "include", "having/containing", "including" and/or "include", when used in this specification, mean that the stated features, integers, steps, operations, components, parts and/or the combinations thereof are present, but do not exclude the presence or addition of one or more other features, integers, steps, operations, components, parts and/or combinations thereof. In addition, when the expression such as "at least one of . . . " appears before the list of listed features, it modifies the entire listed features instead of modifying the individual components in the list. In addition, when describing the embodiments of the present application, as used herein, "may" means "one or more embodiments of the present application". Also, the term "exemplary" refers to an example or illustration.

As used herein, the terms "substantially", "approximately" and similar terms are used as terms representing approximation, not as terms representing degree, and are used to describe the inherent deviation in the measured value or calculated value that will be recognized by those of ordinary skill in the art.

Unless otherwise defined, all terms (including technical terms and scientific terms) used herein have the same meanings as commonly understood by those of ordinary skill in the art to which this application belongs. It should also be understood that, terms (such as those defined in commonly used dictionaries) should be interpreted as having meanings consistent with their meanings in the context of related technologies, and will not be interpreted in an idealized or excessively formal sense unless it is clearly defined in this disclosure.

It should be noted that, the embodiments in this application and the features in the embodiments may be combined with each other if there is no conflict. Hereinafter, the present application will be described in detail with reference to the drawings and in conjunction with the embodiments.

FIG. 1 shows a schematic flow chart of a method for assembling an optical lenses according to an embodiment of the present application. Referring to FIG. 1, the method for assembling the optical lenses includes steps S1-S6.

Figure 2:
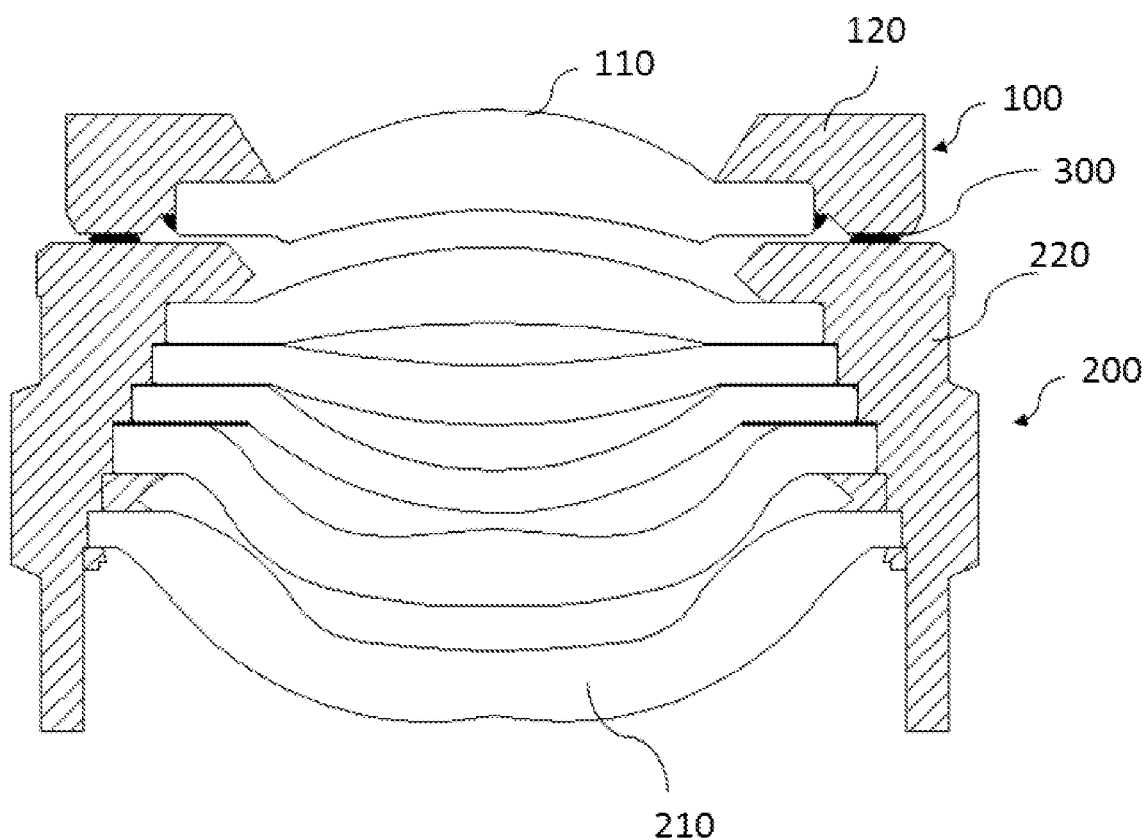
FIG. 2 shows a schematic cross-section view of an assembled optical lenses according to an embodiment of the present application.
Figure 3:
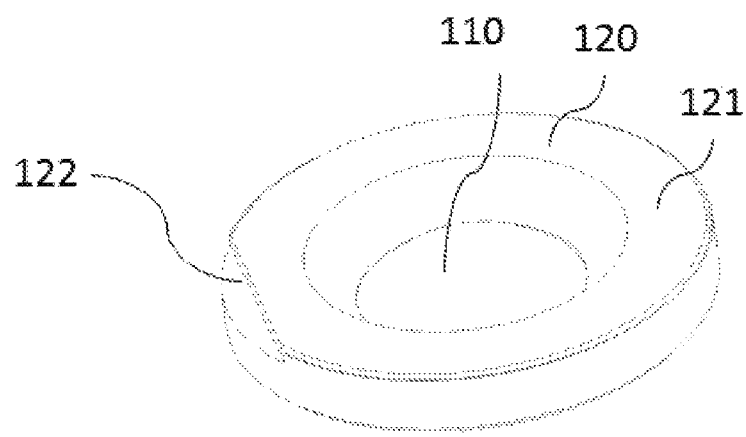
FIG. 3 shows a three-dimensional schematic diagram of a first lenses part according to an embodiment of the present application.
Figure 4:
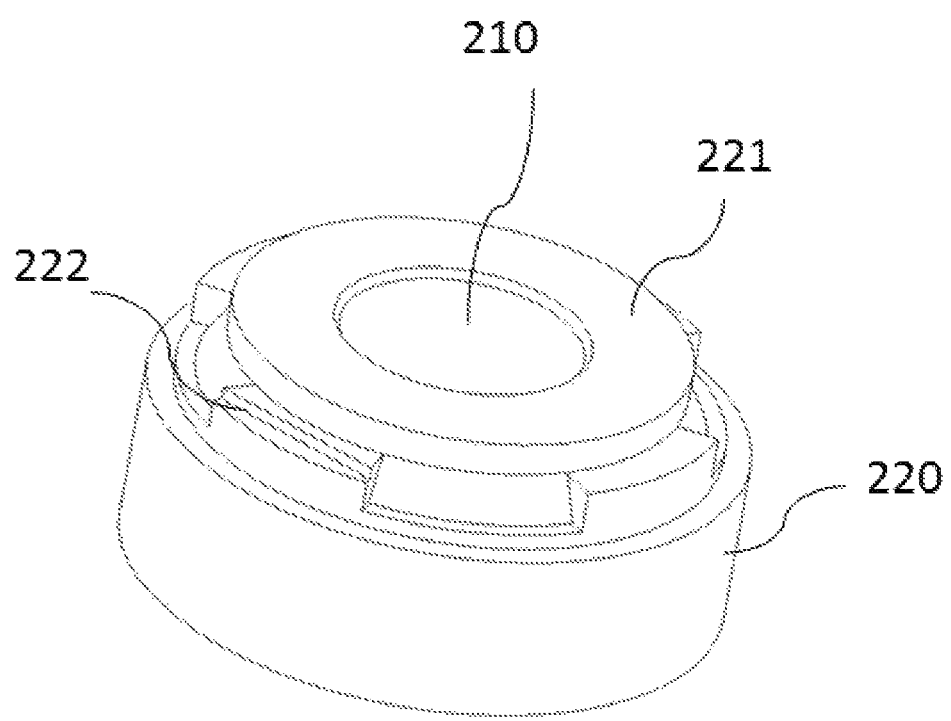
FIG. 4 shows a three-dimensional schematic diagram of a second lenses part according to an embodiment of the present application.

Step S1 is preparing a first lenses part and a second lenses part. FIG. 2 shows a schematic cross-section view of an assembled optical lenses according to an embodiment of the present application. Referring to FIG. 2, a first lenses part 100 includes at least one first lens 110, and a second lenses part 200 includes a second lens barrel 220 and at least one second lens 210 mounted in the second lens barrel 220. It should be noted that in this step, the first lenses part 100 and the second lenses part 200 are separated, and the two parts have not been bonded together (in other words, in this step, the first lenses part 100 and the second lenses part 200 are not bonded together, and an adhesive material 300 is not arranged between the two parts). Further, FIG. 3 shows a three-dimensional schematic diagram of the first lenses part according to an embodiment of the present application. FIG. 4 shows a three-dimensional schematic diagram of the second lenses part according to an embodiment of the present application.

Figure 5A:
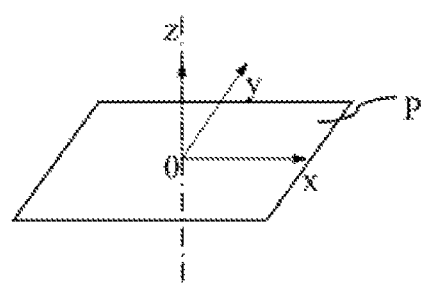
FIG. 5(*a*) shows a three-dimensional rectangular coordinate system according to an embodiment of the present application, wherein three degrees of freedom in x, y, and z directions are shown.
Figure 5B:
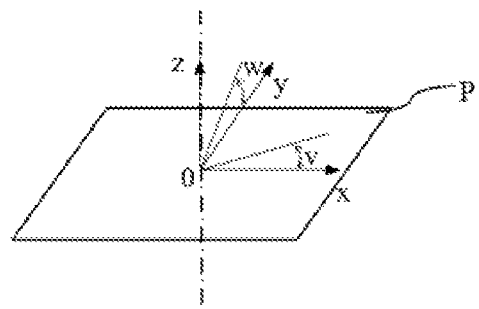
Figure 5C:
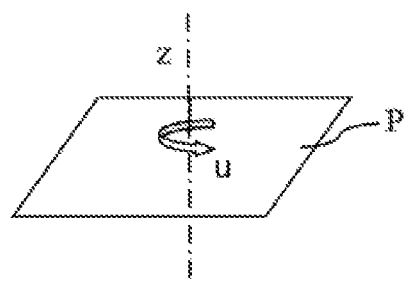

Step S2 is placing the second lenses part on an assembly platform, capturing the first lenses part and moving it above the second lenses part, wherein a capturing mechanism for capturing the first lenses part has six degrees of freedom of movement in x, y, z, u, v, w directions. FIG. 5(a) shows a three-dimensional rectangular coordinate system according to an embodiment of the present application, wherein three degrees of freedom in x, y, and z directions are shown. Referring to FIG. 5(a), x, y, z constitutes the three coordinate axis directions of a three-dimensional rectangular coordinate system with O as an origin. Among them, z direction is consistent with a direction of an optical axis of the optical lenses, and a reference plane P is a plane perpendicular to the z axis. FIG. 5(b) shows two degrees of freedom in v and w directions. With reference to FIG. 5(b), it may be seen that v direction is a direction of rotation around y axis (alternatively, the rotation in v direction may be understood as a rotation on a xoz plane), and w direction is a direction of rotation around x axis (alternatively, the rotation in w direction may be understood as a rotation on a yoz plane). FIG. 5(c) shows a degree of freedom in u direction. With reference to FIG. 5(b), it may be seen that u direction is a direction of rotation around z axis (alternatively, the rotation in u direction may be understood as a rotation on a xoy plane, i.e., a rotation on the reference plane P). It should be noted that, although in this embodiment, the first lenses part is firstly moved above the second lenses part, and then multi-point ranging is performed, the present application is not limited thereto. For example, in another embodiment, after being captured, the first lenses part may be subjected to multi-point ranging so as to reconstruct its current posture (tilt state), and after the tilt adjustment is performed based on the ranging result, the first lenses part is moved above the second lenses part based on a linear movement. In this solution, the multi-point ranging of the first lenses part may be performed simultaneously with the multi-point ranging of the second lenses part, which facilitates to improve production efficiency.

Step S3 is adjusting a posture of the first lenses part according to a laser ranging result, so that an included angle between a first end surface 121 (refer to FIG. 3) of the first lenses part and a second end surface 221 (refer to FIG. 4) of the second lenses part is smaller than a threshold of inclination angle. The threshold of inclination angle may be preset according to the actual situation, and it will be further explained below.

Figure 6:
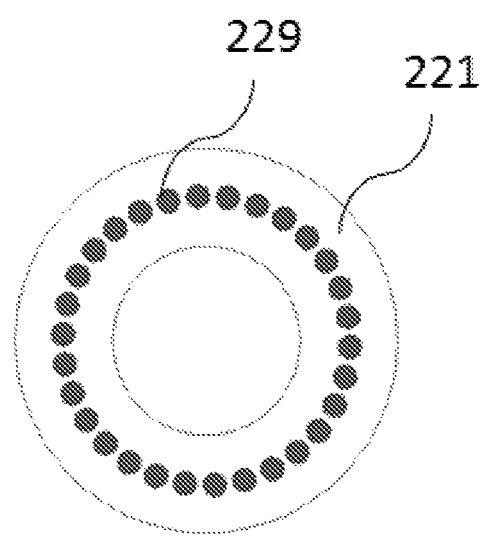
FIG. 6 shows a schematic diagram of manner of distribution of the second distance-measuring points according to an embodiment of the present application.

This step may include the following sub-steps: sub-step S31, measuring at least 30 second distance-measuring points on the second end surface with a distance-measuring device so as to identify a current inclination posture (i.e., in the v and w directions) of the second end surface, wherein the at least 30 second distance-measuring points are distributed in a second area located on the second end surface and surrounding an optical region of the second lens. FIG. 6 shows a schematic diagram of manner of distribution of second distance-measuring points in an embodiment of the present application, and referring to FIG. 6, it may be seen that a plurality of second distance-measuring points 229 are distributed in an annular area of the second end surface 221. It should be noted that, FIG. 6 is only for illustration, and the number of distance-measuring points in FIG. 6 does not represent the actual number of distance-measuring points; actually, the second distance-measuring points may be denser. In some embodiments, the number of distance-measuring points may reach more than 1,000. It should be noted that, the second area in the present application is not limited to a closed annular area. For example, in other embodiments of the present application, the second area may also be a notched annular area, such as a C-shaped area, a semicircle shaped area, etc., and the "ring shape" may be round or square. In other words, the shape of the second area may make the second distance-measuring points distributed around the optical region surrounding the second lens.

Sub-step S32 is measuring at least 30 first distance-measuring points on the first end surface with a distance-measuring device so as to identify a current inclination posture (i.e., in the v and w directions) of the first end surface, and calculating a current included angle between the first end surface and the second end surface, wherein the at least 30 first distance-measuring points are distributed in a first area located on the first end surface and surrounding an optical region of the first lens. For altitude measurement, a flat surface is usually required, and then by utilizing pulse or phase laser ranging method, or triangular laser ranging method, height information of a beam irradiation point (i.e. a ranging point) is obtained based on information carried when the beam returns. Through a certain amount of height information, the posture of the lenses part (i.e., tilt information) may be calculated. In this step, the distribution of the first distance-measuring points on the first end surface may be referred to FIG. 6, and details are not described again. It should be noted that, the first area in the present application is not limited to a closed annular area. For example, in other embodiments of the present application, the first area may also be a notched annular area, such as a C-shaped area, a semicircle shaped area, etc., and the "ring shape" may be round or square. In other words, the shape of the first area may make the first distance-measuring points distributed around the optical region surrounding the first lens.

Sub-step S33 is judging whether the current included angle is less than the threshold of inclination angle, if yes, going to step S4, if not, adjusting the posture of the first lenses part at two degrees of freedom in v and w directions according to the current included angle, and then re-executing step S32 and step S33 until the current included angle is less than the threshold of inclination angle. It should be noted that, for the adjustment of the posture of the first lenses part at two degrees of freedom in v and w directions, it may be performed by adjusting the posture of the first lenses part in two steps in v and w directions; alternatively, by firstly calculating the adjustment of a vector synthesized by combining the two degrees of freedom in v and w directions, and then adjusting the posture of the first lenses part in place in the direction of the vector at a time. After the included angle is adjusted to be less than the threshold of inclination angle, step S4 may be continued. It should be noted that in some cases, it is also possible to adjust the posture of the first lenses part only in the v direction or only in the w direction.

Step S4 is adjusting the first lenses part at a degree of freedom other than the two degrees of freedom in v and w directions, so that the first lenses part together with the second lenses part constitute an imageable optical system. In this step, the first lenses part may be moved at the degree of freedom of linear movement (for example, the xyz degree of freedom), so that the first lenses part and the second lenses part are close to each other and in a roughly coaxial arrangement, and thereby the first lenses part together with the second lenses part constitute an imageable optical system.

Step S5 is performing an active alignment of a position of the first lenses part according to an actual imaging result output by a photosensitive chip disposed under the optical system, wherein the active alignment is performed on at least one degree of freedom in x, y, z, and u directions. In this embodiment, during the active alignment process in step S5, the first lenses part is not moved at the two degrees of freedom in v and w directions.

Step S6 is fixing the first lenses part and second lenses part together, so that relative positions of the two parts are maintained at the relative positions determined by the active alignment. Referring to FIG. 2, the first lenses part and the second lenses part may be bonded together by a first adhesive material.

In the above embodiments, the production efficiency of the camera module may be improved by transferring at least a part of the adjustment in v and w directions from the active alignment step to a pre-adjustment step based on laser ranging. For ease of understanding, a comparative embodiment is introduced for illustration. In this comparative embodiment, multi-point laser ranging may also be used to pre-position the first lenses part and the second lenses part; but generally speaking, since its function is only pre-positioning, there may be only a few distance-measuring points, and the measurement of the distance and the verification of the actual included angle between the first lenses part and the second lenses part will not be performed repeatedly. For example, it is possible to perform one multi-point laser ranging to calculate the included angle between the first lenses part and the second lenses part, thereby calculating the adjustment amount in v and w directions; and then the first lenses part may be adjusted accordingly in v and w directions by a capturing device, i.e., the pre-position in v and w directions is completed. However, there may be tolerances for the capturing device itself (the capturing device may have multiple degrees of freedom, such as six degrees of freedom, and tolerance may be easily introduced in situations with extremely high precision requirements), and the actual amount of movement may be different from the expected amount of movement. In the above embodiments of the present application, the accuracy of the multi-point ranging is significantly improved by at least 30 distance-measuring points distributed in the annular area, and after the adjustment is completed, the multi-point ranging is performed again to verify the actual included angle between first lenses part and the second lenses part, repeating these operations until the actual included angle is less than the preset threshold of inclination angle. This approach may transfer at least a part of the adjustment in v and w directions from the active alignment step to a pre-adjustment step based on laser ranging. Practical tests show that, improving the adjustment accuracy in the v and w directions based on laser ranging in the pre-adjustment step may significantly reduce the burden of the active alignment stage; and overall, it may improve the production efficiency of the camera module.

Further, according to an embodiment of the present application, in the step S3, the threshold of inclination angle is 0.14142 degrees, i.e., after the step S3 is completed, an angle between the first lenses part and the second lenses part is less than 0.1 degrees in the v and w directions.

Further, according to another embodiment of the present application, in the step S3, the threshold of inclination angle is 0.04243 degrees. i.e., after the step S3 is completed, an angle between the first lenses part and the second lenses part in the v and w directions is less than 0.03 degrees.

Further, according to another embodiment of the present application, in the step S3, the threshold of inclination angle is 0.01414 degrees. i.e., after the step S3 is completed, an angle between the first lenses part and the second lenses part in the v and w directions is less than 0.01 degrees.

Further, according to an embodiment of the present application, in the step S3, the number of the first distance-measuring points is at least 500, and the number of the second distance-measuring points is at least 500. For example, the number of the first distance-measuring points may be 1,000, and the number of the second distance-measuring points may also be 1,000.

Further, in an embodiment of the present application, in the step S3, the first end surface is a top surface of the first lenses part, and the second end surface is a top surface of the second lenses part. The distance-measuring device may be arranged above the first lenses part and the second lenses part. In this embodiment, the distance-measuring device may be mounted on a mobile platform, and the mobile platform is adjusted to a horizontal state based on a coordinate measuring instrument (for example, a six-axis coordinate measuring instrument), and then the distance-measuring device is moved by the mobile platform, thereby completing the measurement of all of the first distance-measuring points and the second distance-measuring points. Generally speaking, degree of freedom of movement of the mobile platform may be less than the degree of freedom of movement of the capturing device of the first lenses part. Therefore, it may be understood that, the accuracy of the posture adjustment of the mobile platform may be higher than that of the capturing device. Moreover, since the degree of freedom of the mobile platform is less, the tolerance introduced by the moving process of the mobile platform is also smaller than the tolerance introduced by the movement of the capturing device. Preferably, the number of the first distance-measuring points may be 1,000, and the number of the second distance-measuring points may be 1,000. Through the movement of the above mobile platform, the measurement of all of the first distance-measuring points (for example, 1000 first distance-measuring points) and all of the second distance-measuring points (for example, 1000 second distance-measuring points) may be realized by a single (or a small number of) distance-measuring devices. The mobile platform may be a platform with only degree of freedom of linear movement, such as a mobile platform that only moves in the three directions of xyz; or a rotating platform, such as a mobile platform that may rotate in u direction (i.e., rotating around the optical axis).

Further, in an embodiment of the present application, in the step S6, the first lenses part and the second lenses part are fixed together by bonding with adhesive material. Step S6 may include sub-step S61 of: arranging adhesive material on the top surface of the second lenses part; and sub-step 62 of: curing the arranged adhesive material, so as to bond the first lenses part and the second lenses part together, so that the relative positions of the two parts is maintained at the relative positions determined by the active alignment. In one embodiment, the sub-step S61 may be performed before the step S5, i.e., before the active alignment, firstly the adhesive material is applied to the adhesive applying area on the top surface of the second lenses part, and then the active alignment is performed. Under this scheme, it is more helpful to maintain the accurate positions determined by the active alignment. In another embodiment, the sub-step S61 may be performed after the step S5, i.e., after the active alignment is completed, the first lenses part is removed, then the adhesive material is applied to the adhesive applying area on the top surface of the second lenses part, and then the first lenses part is moved back according to the recorded position determined by the active alignment. Under this scheme, it is possible to prevent the active alignment process from affecting the uniformity of the adhesive material. Particularly, if the adhesive material is applied before the active alignment, during the active alignment process, the bottom surface of the first lenses part may contact the adhesive material, and the movement of the adhesive material may be driven during the movement of the first lenses part, thereby causing the adhesive material to be uneven; however, this problem may be avoid by performing the sub-step S61 after the step S5.

Further, in an embodiment of the present application, in the step S1, the first lenses part may be composed of a single first lens 110, or may be composed of a first lens barrel 120 and one or more first lenses 110 mounted on an inner side surface of the first lens barrel 120 (as shown in FIG. 2). A top surface of the first lens barrel may have a first cutting notch 122 (refer to FIG. 3), and a top surface of the second lens barrel may have a second cutting notch 222 (refer to FIG. 4). The lens barrel (first lens barrel or second lens barrel) is usually molded by injection. In the injection molding process, the injection material needs to be poured into the mold, so after the mold is closed it also needs to retain an entrance, and thereby after the mold is opened, a corresponding redundant structure will be formed at the entrance, and a cutting notch is formed after cutting off the redundant structure. Due to the inconsistency of stress or other conditions at the end close to the entrance and at the end far away from the entrance during the injection molding process, the injection-molded lens barrel may not be completely isotropic (i.e., the injection-molded lens barrel may be anisotropic). The separated lenses of the present application may overcome this anisotropy through the active alignment, so as to improve the imaging quality. However, in the pre-positioning stage, if the directions of the first lenses part and the second lenses part (referring to the directions related to the entrance of injection molding) are randomly arranged, then the adjustment path of the active alignment of different products of a same batch may be significantly different, which brings great difficulties to the active alignment algorithm. Therefore, in one embodiment, in the step S4, the first lenses part may be adjusted at the degree of freedom in u direction, so that the first cutting notch is parallel to the second cutting notch. In this way, the same batch of products may have better consistency, and the active alignment movement path may have better consistency, which facilitates the realization of the active alignment algorithms (for example, machine learning technology may be used to optimize the movement path of the active alignment of the same batch of products), thereby reducing the adjustment time of a single product (i.e., making the image quality meet the design requirements faster), and improving the production efficiency. It should be noted that in other embodiments of the present application, the degree of freedom in u direction of the capturing mechanism of the assembling device may be canceled. In this case, other devices may be used to perform pre-processing before loading so as to adjust the orientation of the first lens barrel and the second lens barrel, so that when the first lens barrel and the second lens barrel are placed on the transfer platform, the first cutting notch is parallel to the second cutting notch. In this way, when the assembling device is loaded through the capturing mechanism, it only needs to maintain the state of the first lens barrel and the second lens barrel in u direction (i.e., the direction of rotation around the optical axis), and then the first cutting notch is kept to be substantially parallel to the second cutting notch. Therefore, the degree of freedom in u direction of the capturing mechanism of the assembling device may be eliminated. Reducing the degree of freedom of movement of the capturing mechanism of the assembling device may help improve the accuracy of the capturing mechanism, and improve the work efficiency of the capturing mechanism.

Further, in an embodiment, in the step S4, whether the first cutting notch is parallel to the second cutting notch may be judged by photographing the first lenses part and the second lenses part and identifying the resulting photographs based on computer vision technology.

In the above embodiments, the capturing mechanism for capturing the first lenses part has six degrees of freedom of movement in the x, y, z, u, v, and w directions. However, it should be noted that in other embodiments of the present application, the degree of freedom of movement of the capturing mechanism may be reduced. For example, in one embodiment, there may be only five degrees of freedom of movement in the x, y, z, v, and w directions. It is easy to understand that, the capturing mechanism for capturing the first lenses part may have degree of freedom of linear movement and degree of freedom of posture adjustment. In the step 3), the degrees of freedom may be adjusted in the posture, and the distance-measuring device may be used to adjust the posture of the first lenses part and the second lenses part. In the step 5), the position of the first lenses part may be actively aligned only in the linear movement degree of freedom. Since the difficulty of the active alignment algorithm is significantly reduced, the overall production efficiency of the camera module may be improved. The degree of freedom of linear movement may include the degrees of freedom in the x, y, and z directions, and the degree of freedom of posture adjustment may include the degrees of freedom in the v and w directions. The capturing mechanism may include a clamp (or suction nozzle), and the clamp (or suction nozzle) may clamp (or suck) the first lenses part. When the first lenses part has a lens barrel, the clamp (or suction nozzle) may clamp (or suck) the first lens barrel (i.e., the lens barrel of the first lenses part); when the first lenses part does not have a lens barrel, the clamp (or suction nozzle) directly clamps (or sucks) the first lens. A lens usually includes an optical region for imaging and a structure area surrounding the optical region. As for clamping (or sucking) the first lens, it may be understood as clamping (or sucking) the structure area of the first lens.

It should be noted that in the above embodiments, although the second lenses part has a second lens barrel, the application is not limited thereto. For example, in a modified embodiment, multiple wafer-level lenses may be assembled based on the active alignment technology. Wafer-level lenses are sometimes called wafer level lenses. When assembling the optical lenses, a part of the wafer level lenses may be assembled into a first lens group based on the wafer level process, and the other part of the wafer level lenses may be assembled into a second lens group based on the wafer level process. Then, the first lens group and the second lens group are assembled into an optical lenses based on the active alignment process. The first lens group assembled based on the Wafer level process (it may have only a single first lens) may be regarded as the first lenses part in the foregoing embodiments, and the second lens group assembled based on the Wafer level process may be regarded as the second lenses part in the foregoing embodiments. Since in this modified embodiment, the first lens group and the second lens group may not have a lens barrel, the first end surface and the second end surface required for distance measurement may be the end surface of the structure area of the first lens group and the end surface of the structure area of the second lens group, respectively. In this modified embodiment, since at least part of the adjustment in the v and w directions may be transferred from the active alignment step to the pre-adjustment step based on laser ranging, the algorithm difficulty of the active alignment between the two lens groups (the first lens group and the second lens group) may be reduced so as to significantly shorten the time of the active alignment, thereby improving the overall production efficiency of the camera module. It should be noted that in this application, the lens groups are not limited to two groups, and three or more lens groups may be assembled based on the active alignment process.

Further, according to an embodiment of the present application, a method for assembling a camera module is also provided, which includes step a and step b.

Step a is assembling the optical lenses by the method for assembling an optical lenses according to any of the above embodiments.

Step b is assembling the optical lenses and the photosensitive assembly together to obtain a camera module.

Further, in one embodiment, the step b includes sub-steps b1 and b2.

Sub-step b1 is adjusting a relationship of relative positions between the photosensitive assembly and the second lenses part based on resolution of an output image of the photosensitive assembly, so as to compensate for inclination of an image plane of the optical lenses.

Sub-step b2, bonding the second lenses part and the photosensitive assembly together, so that the relative positions of the two are maintained at the relative positions determined in the step b1.

Further, in an embodiment, the sub-step b1 and the step S5 may be performed simultaneously, i.e., after completion of the active alignment in step S5 and the position adjustment to compensate for inclination of the image plane in step b1, the first lenses part and the second lenses part are bonded, and then the second lenses part and the photosensitive assembly are bonded together.

Further, according to an embodiment of the present application, there also provides an optical lenses, which includes: a first lenses part, a second lenses part, and a first adhesive material. The first lenses part includes at least one first lens, and the second lenses part includes a second lens barrel and at least one second lens mounted in the second lens barrel. The first adhesive material is located in a gap between the first lenses part and the second lenses part, and supporting and fixing the first lenses part and the second lenses part after being cured, so that their relative positions are maintained in the relative positions determined by active alignment. A central axis of the first lenses part and a central axis of the second lenses part have a non-zero included angle, and an included angle is less than 0.14142 degrees. The included angle is determined by posture adjustment accuracy based on multi-point laser ranging. In another embodiment, when an angle threshold with higher precision for posture adjustment based on multi-point laser ranging is adopted, the included angle is less than 0.04243 degrees; and at this time, the assembled camera module or optical lenses may have better imaging quality, and may be used in middle- or high-class products. In another embodiment, when an angle threshold with higher precision for posture adjustment based on multi-point laser ranging is adopted, the included angle is less than 0.01414 degrees; at this time, the assembled camera module or optical lenses may have better imaging quality, especially it is suitable for high-class products. Moreover, in this embodiment, since the relative positions of the first and second lenses parts need to be adjusted in linear degrees of freedom (for example, in x or y direction) during the active alignment process, in the assembled optical lenses, a distance between the central axis of the first lenses part and the central axis of the second lenses part in a radial direction of the optical lenses is not zero and less than 50 microns. The radial direction herein refers to the direction perpendicular to the optical axis of the optical lenses.

Further, in one embodiment, a first cutting notch is provided on the first end surface of the first lenses part, and a second cutting notch is provided on the second end surface of the second lenses part.

Figure 7:
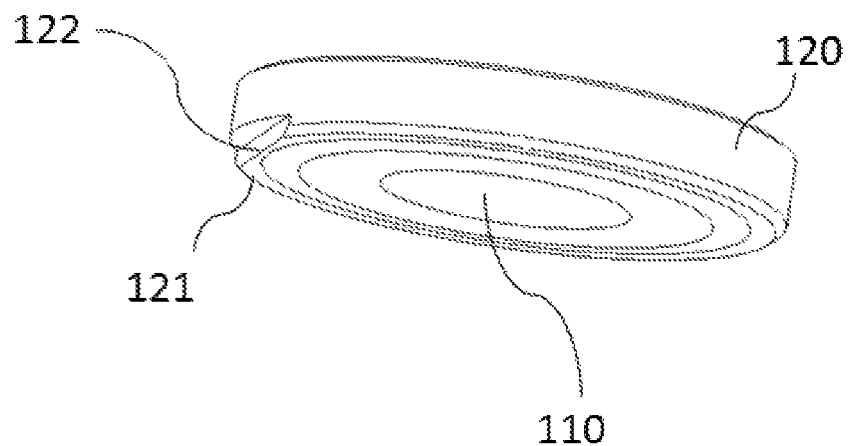
FIG. 7 shows a three-dimensional schematic diagram of a first lenses part with a first cutting notch on a bottom surface according to an embodiment of the present application.
Figure 8:
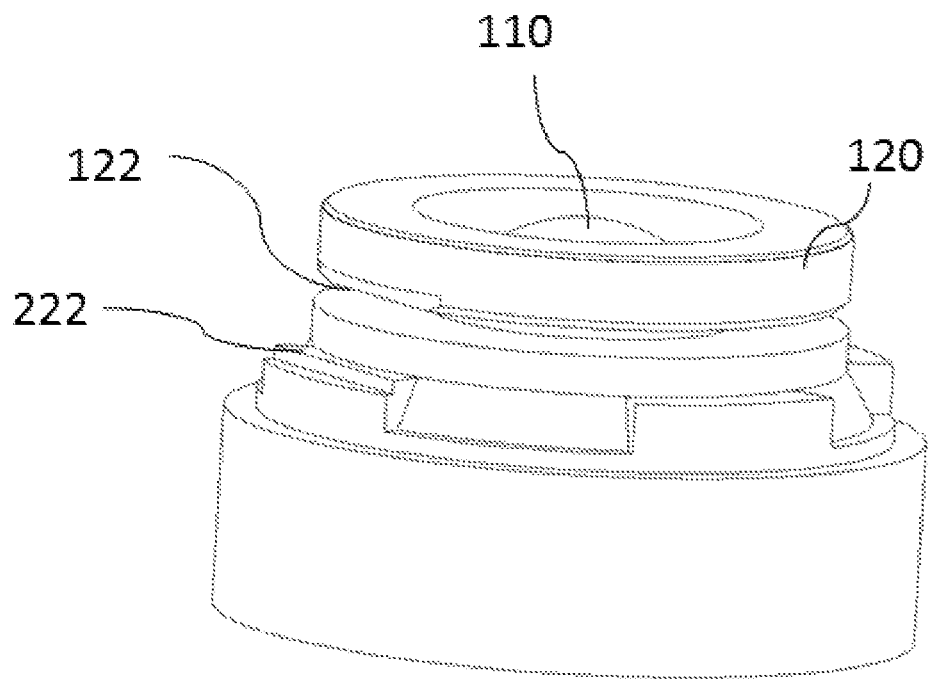
FIG. 8 shows a three-dimensional schematic diagram of an optical lenses according to an embodiment of the present application, wherein a first cutting notch and a second cutting notch are arranged in a gap between a first lenses part and a second lenses part.

Further, in an embodiment, the first cutting notch 122 is located on a bottom surface of the first lenses part (referring to FIG. 7, which is a three-dimensional schematic diagram showing that a first cutting notch is located on the bottom surface of a first lenses part in one embodiment according to the present application), and the second cutting notch 222 is located on the top surface of the second lenses part (referring to FIG. 4). The top surface herein refers to the upper surface that may be directly photographed when shooting from above. When the second lenses part has a shoulder, the second cutting notch may be located on the shoulder. At this time, since the shoulder of the second lenses part may be directly photographed from above, the second cutting notch located on the shoulder may be regarded as being located on the top surface of the second lenses part. In this embodiment, the cutting notchs (a first cutting notch and a second cutting notch) are set in the gap between the first lenses part and the second lenses part, so as to avoid the influence of the cutting notch on the appearance of the product, thereby improving the appearance of the product. FIG. 8 is a three-dimensional schematic diagram showing an optical lenses in which the first cutting notch and the second cutting notch are arranged in the gap between the first lenses part and the second lenses part in an embodiment according to the present application.

Figure 9:
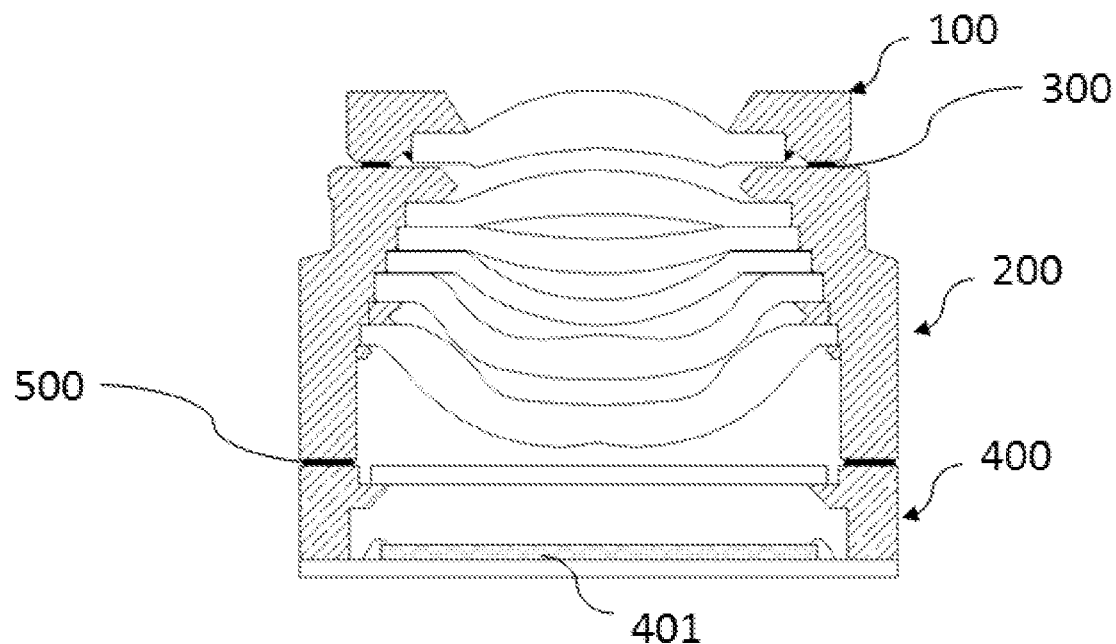
FIG. 9 shows a schematic cross-section view of a camera module according to an embodiment of the present application.

Further, FIG. 9 is a schematic cross-section view showing a camera module in an embodiment according to the present application. Referring to FIG. 9, according to an embodiment of the present application, there provides a camera module, which includes optical lenses and a photosensitive assembly 400, and the photosensitive assembly 400 and the optical lenses are assembled together by a second adhesive material 500, wherein the photosensitive assembly 400 includes a photosensitive chip 401. The optical lenses may be the optical lenses of any one of the foregoing embodiments. The optical lenses may be composed of the first lenses part 100 and the second lenses part 200 bonded together by an adhesive material 300. The relative positions of the first lenses part 100 and the second lenses part 200 may be determined by the active alignment. For the specific assembly method, the foregoing embodiments are referred, and it will not be repeated here.

Figure 10:
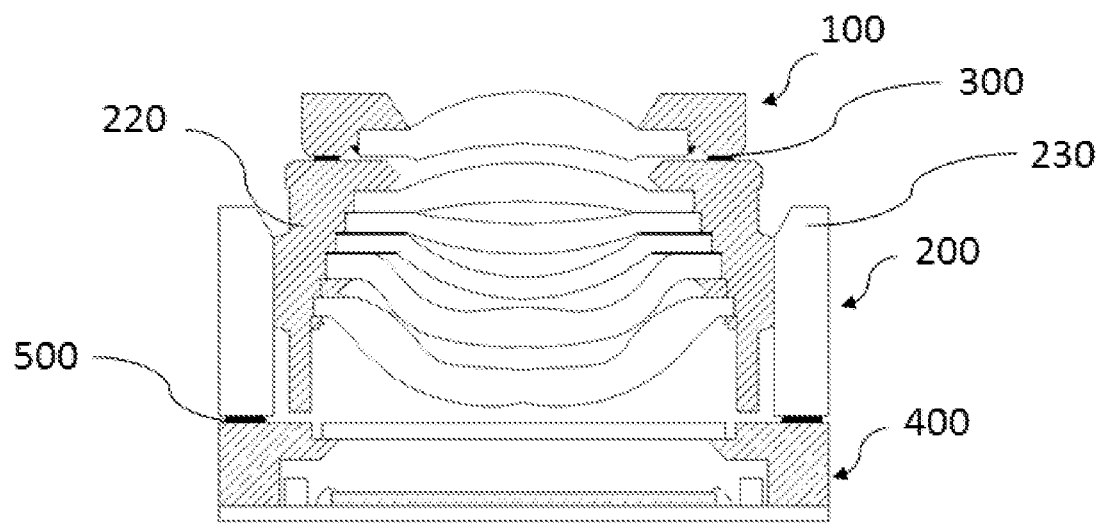
FIG. 10 shows a schematic cross-section view of a camera module according to another embodiment of the present application.

Further, FIG. 10 is a schematic cross-section view showing a camera module of another embodiment according to the present application. Referring to FIG. 10, in this embodiment, the second lenses part may include a motor 230 (i.e., an optical actuator). The motor 230 may be located outside of the second lens barrel 220. Particularly, the second lens barrel 220 may be mounted on an inner side of a carrier of the motor, wherein the carrier of the motor is usually cylindrical.

Further, according to an embodiment of the present application, another method for assembling a camera module is provided, in this method, the optical lenses and photosensitive assembly may be firstly prepared (made or purchased), and then active alignment is performed by the design idea of this application when the optical lenses and the photosensitive assembly are assembled. Particularly, the optical lenses may be regarded as the aforementioned first lenses part, and the photosensitive assembly may be regarded as the aforementioned second lenses part, and the relative positions of the optical lenses and the photosensitive assembly may be actively aligned based on the actual imaging result, and then bonding (or permanently fixing in other ways) the optical lenses and the photosensitive assembly by their relative positions determined by the active alignment. The assembly method of this camera module is commonly referred to as AA (Active alignment) assembly. In this embodiment, the overall production efficiency of the camera module may be improved by transferring at least a part of the adjustment in the v and w directions from the active alignment step to the pre-adjustment step based on laser ranging. At the time of performing laser ranging, the end surface of the optical lenses may be regarded as the end surface of the first lenses part, and the end surface of the photosensitive assembly of the optical lenses may be regarded as the end surface of the second lenses part. The rest of this embodiment is substantially the same as the assembly of the optical lenses described above, and will not be repeated here.

The above description is only the illustration of the preferred embodiments according to the present application and the applied technical principles. Those skilled in the art should understand that, the scope of the invention involved in this application is not limited to the technical solutions formed by the specific combination of the above technical features, and should also cover other technical solutions formed by any combination of the above technical features or the equivalent features without departing from the concept of the invention. For example, technical solutions formed by mutually replacing between the above features and the technical features disclosed herein (but not limited to them) with similar functions.

The invention claimed is:

1. A method for assembling an optical lenses, characterized by comprising:
   1) preparing a first lenses part including at least one first lens and a second lenses part including at least one second lens;
   2) capturing the first lenses part, wherein a capturing mechanism for capturing the first lenses part has a degree of freedom of linear movement and a degree of freedom of posture adjustment;
   3) adjusting a posture of the first lenses part at the degree of freedom of posture adjustment according to a distance measurement result, so that an included angle between a first end surface of the first lenses part and a second end surface of the second lenses part is less than a threshold of inclination angle; wherein the distance measurement includes: 31) measuring at least 30 second distance-measuring points on the second end surface with a distance-measuring device so as to identify a current inclination posture of the second end surface, wherein the at least 30 second distance-measuring points are distributed in a second area located on the second end surface and surrounding an optical region of the second lens; 32) measuring at least 30 first distance-measuring points on the first end surface with a distance-measuring device so as to identify a current inclination posture of the first end surface, and calculating a current included angle between the first end surface and the second end surface, wherein the at least 30 first distance-measuring points are distributed in a first area located on the first end surface and surrounding an optical region of the first lens; 33) judging whether the current included angle is less than the threshold of inclination angle, and if yes, going to step 4), and if not, adjusting the posture of the first lenses part at two degrees of freedom in v and w directions according to the current included angle, and then re-executing step 32) and step 33) until the current included angle is less than the threshold of inclination angle;
   4) adjusting the first lenses part at the degree of freedom of linear movement, so that the first lenses part together with the second lenses part constitute an imageable optical system;
   5) performing an active alignment of a position of the first lenses part according to an actual imaging result output by a photosensitive chip disposed under the optical system, wherein the active alignment is performed at the degree of freedom of linear movement; and
   6) fixing the first lenses part and second lenses part together, so that relative positions of the two parts are maintained at the relative positions determined by the active alignment.

2. The method for assembling the optical lenses according to claim 1, characterized in that in the step 5), the first lenses part is not moved at the degree of freedom of posture adjustment during the process of the active alignment.

3. The method for assembling the optical lenses according to claim 2, characterized in that the degree of freedom of linear movement include three degrees of freedom in x, y, and z directions, wherein x, y and z constitute three coordinate axis directions of a three-dimensional rectangular coordinate system with O as an origin, and z direction is consistent with a direction of an optical axis of the optical lenses; and the degree of freedom of posture adjustment include two degrees of freedom in v and w directions, and v direction is a direction of rotation around y axis, and w direction is a direction of rotation around x axis.

4. The method for assembling the optical lenses according to claim 3, characterized in that in the step 2), the capturing mechanism further has a degree of freedom of rotation in u direction, wherein u direction is a direction of rotation around z axis.

5. The method for assembling the optical lenses according to claim 4, characterized in that in the step 1), the first lenses part further includes a first lens barrel, and the at least one first lens is mounted on an inner side surface of the first lens barrel; and the second lenses part further includes a second lens barrel, and the at least one second lens is mounted on an inner side surface of the second lens barrel.

6. The method for assembling the optical lenses according to claim 5, characterized in that in the step 1), a first cutting notch is provided on a top surface or a bottom surface of the first lens barrel, and a second cutting notch is provided on a top surface of the second lens barrel.

7. The method for assembling the optical lenses according to claim 6, characterized in that in the step 4), the first lenses part is adjusted at the degree of freedom in the u direction, so that the first cutting notch is parallel to the second cutting notch.

8. The method for assembling the optical lenses according to claim 7, characterized in that in the step 4), the first lenses part and the second lenses part are photographed and the photographs are identified based on computer vision technology, so as to determine whether the first cutting notch is parallel to the second cutting notch.

9. The method for assembling the optical lenses according to claim 1, characterized in that in the step 3), the threshold of inclination angle is 0.14142 degrees or 0.04243 degrees or 0.01414 degrees.

10. The method for assembling the optical lenses according to claim 1, characterized in that in the step 3), the number of the first distance-measuring points is at least 1,000, and the number of the second distance-measuring points is at least 1,000.

11. The method for assembling the optical lenses according to claim 1, characterized in that in the step 3), the first end surface is a top surface of the first lenses part, and the second end surface is a top surface of the second lenses part.

12. The method for assembling the optical lenses according to claim 11, characterized in that the step 6) includes:
   61) arranging an adhesive material on the top surface of the second lenses part; and
   62) curing the arranged adhesive material, thereby fixing the first lenses part and the second lenses part together, so that the relative positions of the two parts are maintained at the relative positions determined by the active alignment.

13. The method for assembling the optical lenses according to claim 12, characterized in that the step 61) is performed before the step 5) or after the step 5).

14. The method for assembling the optical lenses according to claim 1, characterized in that in the step 6), the first lenses part and the second lenses part are fixed together by bonding with adhesive material.

15. The method for assembling the optical lenses according to claim 1, characterized in that in the step 3), the measurement of the at least 30 first distance-measuring points and the measurement of the at least 30 second distance-measuring points are realized by moving a distance-measuring device.

16. The method for assembling the optical lenses according to claim 15, characterized in that in step 3), the distance-measuring device is mounted on a mobile platform, and the mobile platform is adjusted to a horizontal state based on a coordinate measuring instrument, and then the distance-measuring device is moved by the mobile platform so as to complete the measurement of all of the first distance-measuring points and the second distance-measuring points.

17. A method for assembling a camera module, characterized by comprising:
   a) assembling an optical lenses by the method for assembling the optical lenses according to 1; and
   b) assembling the optical lenses and a photosensitive assembly together to obtain a camera module.

18. The method for assembling the camera module according to claim 17, characterized in that the step b) includes:
   b1) adjusting a relationship of relative positions between the photosensitive assembly and the second lenses part based on resolution of an output image of the photosensitive assembly, so as to compensate for inclination of an image plane of the optical lenses;
   b2) bonding the second lenses part and the photosensitive assembly together, so that the relative positions of the two are maintained at the relative positions determined in the step b1).

19. The method for assembling the camera module according to claim 18, characterized in that the step b1) and the step 5) are performed simultaneously.

20. An method for assembling a camera module, characterized by comprising:
   1) preparing separated first module part and second module part, wherein the first module part and the second module part are respectively an optical lenses and a photosensitive assembly; alternatively, the first module part and the second module part are respectively a photosensitive assembly and an optical lenses;
   2) capturing the first module part, wherein a capturing mechanism for capturing the first module part has a degree of freedom of linear movement and a degree of freedom of posture adjustment;
   3) adjust a posture of the first module part at the degree of freedom of posture adjustment according to a distance measurement result, so that an included angle between a first end surface of the first module part and a second end surface of the second module part is less than a threshold of inclination angle; wherein the distance measurement includes: 31) measuring at least 30 second distance-measuring points on the second end surface with a distance-measuring device so as to identify a current inclination posture of the second end surface, wherein the at least 30 second distance-measuring points are distributed in a second area located on the second end surface and surrounding a light-passing area of the optical lenses; 32) measuring at least 30 first distance-measuring points on the first end surface with a distance-measuring device so as to identify a current inclination posture of the first end surface, and calculating a current included angle between the first end surface and the second end surface, wherein the at least 30 first distance-measuring points are distributed in a first area located on the first end surface and surrounding the light-passing area of the optical lenses; 33) judging whether the current included angle is less than the threshold of inclination angle, and if yes, going to step 4), and if not, adjusting the posture of the first module part at two degrees of freedom in v and w directions according to the current included angle, and then re-executing step 32) and step 33) until the current included angle is less than the threshold of inclination angle;

4) adjusting the first module part at the degree of freedom of linear movement, so that the first module part together with the second module part constitute an imageable optical system;

5) performing an active alignment of a position of the first module part according to an actual imaging result output by a photosensitive chip disposed under the optical system, wherein the active alignment is performed at the degree of freedom of linear movement; and 6) fixing the first module part and second module part together, so that relative positions of the two parts are maintained at the relative positions determined by the active alignment.

* * * * *